United States Patent [19]

Noomen et al.

[11] 4,358,477

[45] Nov. 9, 1982

[54] PROCESS OF CURING UNSATURATED EPOXY COATING COMPOSITION WITH RADIATION AND EPOXY CURING AGENT, AND COATED SUBSTRATE

[75] Inventors: Arie Noomen, Voorhout; Johannes Mostert, Katwijk Aan Zee; Egbert Wolters, Amsterdam, all of Netherlands

[73] Assignee: Akzo N.V., Arnhem, Netherlands

[21] Appl. No.: 72,603

[22] Filed: Sep. 5, 1979

[30] Foreign Application Priority Data

Sep. 7, 1978 [NL] Netherlands ................. 7809122

[51] Int. Cl.$^3$ .................. B32B 27/16; C08F 2/50
[52] U.S. Cl. .................. 427/54.1; 204/159.15; 204/159.19; 204/159.23; 427/44; 525/922; 528/75; 528/76; 528/110; 528/393
[58] Field of Search ............ 204/159.15; 525/922; 427/54.1, 44

[56] References Cited

U.S. PATENT DOCUMENTS

| | | | |
|---|---|---|---|
| 3,450,613 | 6/1969 | Steinberg | 204/159.15 |
| 3,753,755 | 8/1973 | Olson | 525/112 |
| 3,928,491 | 12/1975 | Waters | 525/922 |
| 3,980,483 | 9/1976 | Nishikubo et al. | 525/922 |
| 4,025,407 | 5/1977 | Chang et al. | 204/159.14 |
| 4,092,443 | 5/1978 | Green | 204/159.22 |
| 4,156,035 | 5/1979 | Tsao et al. | 204/159.15 |

FOREIGN PATENT DOCUMENTS 2126419 12/1971 Fed. Rep. of Germany.
1331696 9/1973 United Kingdom.

OTHER PUBLICATIONS

Lee et al., "Handbook of Epoxy Resins", McGraw Hill, 1967, p. 5–1.

*Primary Examiner*—John C. Bleutge
*Assistant Examiner*—A. H. Koeckert
*Attorney, Agent, or Firm*—Stevens, Davis, Miller & Mosher

[57] ABSTRACT

The invention relates to a radiation curable liquid coating composition based on (A) an epoxy compound containing an acryloyl and/or methacryloyl group, (B) a cross-linking agent for the epoxy groups of component (A) and a photoinitiator. The invention also relates to a process for coating a substrate with such a composition, and to the substrate thus manufactured.

7 Claims, No Drawings

PROCESS OF CURING UNSATURATED EPOXY COATING COMPOSITION WITH RADIATION AND EPOXY CURING AGENT, AND COATED SUBSTRATE

This invention relates to a process for coating a substrate by applying to it a radiation curable liquid coating composition based on an epoxy compound containing at least one acryloyl group and/or methacryloyl group and subjecting said composition to radiation having a wavelength range of 90 to 600 nm.

From the German patent application No. 2 126 419 it is known that conversion products of an epoxy resin and excess acrylic acid which are dissolved in acrylic esters can be cured in the presence of a photoinitiator under the influence of ultraviolet light. Such compositions are used as a filling material for teeth. However, if such compositions are to be applied in thin layers as a radiation curable coating composition, then it is found that the curing is insufficient, particularly if it takes place in the presence of atmospheric oxygen. Moreover, British Patent Specification No. 1,331,696 proposes the use of coating compositions based on an unsaturated hydroxy group-containing polyester obtained by reacting a polyglycidyl ester of an organic polybasic acid with (meth)acrylic acid, which compositions may be cured by UV-light.

Although radiation having a wavelength of 90 to 600 nm as curing means offers the advantages of low energy consumption and rapid curing without an attendant high rise in temperature of the substrate, coating compositions having a hiding pigment will insufficiently rapidly cure throughout the coating in that the pigment obstructs radiation. Furthermore, in the case of non-flush substrates such as automobile bodies and chassis or components of steel structures it is not simple to radiate and cure every part of the coating, partly as a result of the distance from the radiation source(s) to the substrate not being constant. Finally, because of oxygen inhibition at the surface generally a too low scratch hardness of the coating is obtained and adhesion of the composition to the substrate is detrimentally influenced as a result of shrinkage.

An object of the invention is to provide a process in which the above-mentioned drawbacks are obviated. According to the invention curing is carried out in two, mainly separate, steps, initial curing being effected by radiation and further curing taking place as a result of a chemical reaction in which the epoxy groups of the epoxy compound which contains at least one (meth)acryloyl group are cross-linked.

The process according to the invention is characterized in that a composition which is substantially made up of:

(A) an epoxy compound containing at least one acryloyl group and/or methacryloyl group, (B) a cross-linking agent for the epoxy groups of component A, and (C) a photoinitiator in an amount of 0,1 to 10% by weight, based on the epoxy compound, is applied to the substrate, and the coating is subjected to radiation.

Use of the process of the invention results in rapid surface drying upon radiation of the composition which may or may not contain a pigment, as a result of which the coated object is hardly affected by depositing dust and can be handled and transported very shortly after being treated. As a result, a high rate of passage during manufacture and an effective use of the spraying and drying booths are attained. The second curing step to be applied according to the invention has the important advantage that the coating layer will finally have a hardness which is sufficient also in those places which were not or insufficiently radiated and cured in the first curing step.

As epoxy basis of the epoxy compounds to be used according to the invention and containing at least one acryloyl group and/or methacryloyl group there may generally be employed any epoxy compound having 2 or more epoxy groups. These compounds generally have a number average molecular weight in the range of 200 to 20000. As examples of suitable starting epoxy compounds may be mentioned the diglycidyl ethers of bisphenols such as Bisphenol A and Bisphenol F, having a number average molecular weight in the range of 300 to 15000. As examples of other suitable epoxy compounds may be mentioned the polyglycidyl ethers of phenol formaldehyde novolac and hydantoine epoxy resins. Also mixtures of epoxy compounds may be used.

Introducing one or more acryloyl groups and/or methacryloyl groups into the above-envisaged epoxy compounds may be effected in several ways, for instance by direct esterification of the epoxy compound(s) with acrylic acid and/or methacrylic acid. The carboxylic acid is, of course, to be used in a less than stoichiometric amount in order that a reaction product may be obtained having at least one epoxy group per molecule. Direct esterification of the epoxy compound(s) with (meth)acrylic acid is generally carried out at a temperature in the range of 60° to 140° C., with stirring and passing through a stream of inert gas such as nitrogen. The reaction mixture generally contains a catalyst for the esterification and an inhibitor to prevent premature polymerization of one or more ethylenically unsaturated components. As examples of suitable esterification catalysts may be mentioned benzyltrimethyl ammonium methoxide, dimethylbenzylamine, zirconium octoate and triphenylbenzyl phosphonium chloride. As examples of suitable polymerization inhibitors may be mentioned hydroquinone, p-tert. butyl catechol and tert. butyl hydroquinone. If desired, use may be made of organic solvents, for instance: aromatic solvents such as toluene and xylene.

Another suitable method of introducing acryloyl groups and/or methacryloyl groups into the epoxy compounds is by reacting the epoxy group with a polyvalent carboxylic acid and a hydroxy acrylate compound. The reaction is generally carried out in 2 steps, but this is not strictly necessary. In a first step generally a half ester is formed from the carboxylic acid and the hydroxy acrylate compound at a temperature between 60° and 140° C., after which the resulting half ester is reacted with the epoxy compound at a temperature between 60° and 140° C. Suitable polyvalent carboxylic acids include aromatic carboxylic acids, such as phthalic acid, p-carboxymethyl benzoic acid, dichlorophthalic acid, tetrachlorophthalic acid, naphthalene-2,6-dicarboxylic acid, biphenyl-o,o'-dicarboxylic acid and trimellitic acid. As examples of other suitable polyvalent carboxylic acids may be mentioned (cyclo)aliphatic carboxylic acids such as oxalic acid, malonic acid, succinic acid, glutaric acid, adipic acid, azelaic acid, sebacic acid, maleic acid, fumaric acid, itaconic acid, citraconic acid, tetrahydrophthalic acid, endomethylene tetrahydrophthalic acid, hexachloroendomethylene tetrahydrophthalic acid and/or hexahydrophthalic acid. It is preferred that use should be made of aliphatic or cycloaliphatic dicarboxylic acids having 2 to 10 carbon atoms. If desired, besides or instead of the carboxylic acid compound(s) there may be used the corresponding acid anhydrides or alkyl esters, the alkyl group of which generally contains 1 to 4 carbon atoms. As examples of suitable anhydrides may be mentioned tetrahydrophthalic anhydride, trimellitic anhydride, succinic anhydride and maleic anhydride. An example of a suitable alkyl ester is dimethyl terephthalate.

Suitable hydroxyacrylates include:

2-hydroxyethylacrylate, 2-hydroxyethylmethacrylate, 3-hydroxypropylacrylate, 3-hydroxypropylmethacrylate, 4-hydroxybutylacrylate, 8-hydroxyoctylacrylate, 12-hydroxydodecanylacrylate, 2-hydroxy-3-chloropropyl acrylate, 2-hydroxy-3-acryloxypropylacrylate, 2-hydroxy-3-methacryloxypropylmethacrylate, trimethylol propanediacrylate, trimethylol propanedimethacrylate, pentaerythritoltriacrylate and pentaerythritoltrimethacrylate. Also mixtures of 2 or more hydroxy (meth)acrylates may be used. It is preferred that use should be made of 2-hydroxyethylacrylate, 4-hydroxybutylacrylate and/or pentaerythritoltriacrylate.

Another method of preparation consists in the reaction of a hydroxyl group(s)-containing epoxy compound with an at least one free isocyanate group-containing adduct from a polyisocyanate and a hydroxyacrylate. The hydroxyl group(s) in the epoxy compound to be used may be contained in the molecule right from the start or subsequently be introduced into it, for instance by reaction with a less than stoichiometric amount of (met)acrylic acid. As examples of suitable polyisocyanates may be mentioned polyisocyanates having 4 to 44 carbon atoms and 2 to 4, preferably 2 or 3, isocyanate groups per molecule. The polyisocyanate may be of an aliphatic, cycloaliphatic or aromatic nature and should preferably contain 15 to 40 carbon atoms. As examples of suitable (cyclo)aliphatic diisocyanates may be mentioned tetramethylene-1,4-diisocyanate, hexamethylene-1,6-diisocyanate, ω,ω'-dipropylether diisocyanate, thiodipropyl diisocyanate, 2,4,4-trimethylhexane-1,6-diisocyanate, cyclohexyl-1,4-diisocyanate, isophoron diisocyanate, the adduct of 1 molecule of 1,4-butanediol and 2 molecules of isophoron diisocyanate, the adduct of 1 molecule of 1,4 butanediol and 2 molecules of hexamethylene diisocyanate, dicyclohexylmethane-4,4'-diisocyanate, dicyclohexyldimethylmethane-4,4'-diisocyanate, xylylene diisocyanate, 1,5-dimethyl-(2,4-ω-diisocyanatomethyl) benzene, 1,5-dimethyl-(2,4-ω-diisocyanatoethyl) benzene, 1,3,5 trimethyl-(2,4-ω-diisocyanatomethyl) benzene and 1,3,5-triethyl-(2,4-ω-diisocyanatomethyl) benzene. As examples of suitable aromatic diisocyanates may be mentioned toluene diisocyanate, diphenylmethane-4,4'-diisocyanate, naphthalene diisocyanate, 3,3'-bistoluene diisocyanate, and 5,5'-dimethyldiphenylmethane-4,4'-diisocyanate. As examples of suitable triisocyanates may be mentioned the adduct of 3 molecules of hexamethylene-1,6-diisocyanate and 1 molecule of water (available under the trade name Desmodur N of Bayer), the adduct of 1 molecule of trimethylol propane and 3 molecules of isophoron diisocyanate, and the adduct of 1 molecule of trimethylol propane and 3 molecules of toluene diisocyanate (marketed by Bayer under the trade name Desmodur L). A suitable tetraisocyanate is for example the adduct of 1 molecule of pentaerythritol and 4 molecules of hexamethylene-1,6-diisocyanate. Also mixtures of two or more of the above-envisaged polyisocyanates may be used.

The formation of the above-described adduct from a polyisocyanate and a hydroxy(meth)acrylate and the reaction of the resulting adduct with the hydroxyl group(s)-containing epoxy compound may generally be carried out by adding the reaction components together in any arbitrarily chosen way, optionally at elevated temperature. It is preferred that the reaction should be carried out under anhydrous conditions in an atmosphere of an inert gas at temperatures in the range of 5° to 100° C., more particularly in the range of 20° to 80° C. Although generally the reaction components may be added together in any arbitrarily chosen way, it will as a rule be preferred that the hydroxy(meth)acrylate should be added to the polyisocyanate, which may be done in several steps, if desired. As a rule, the reaction will be carried out in the presence of an inert solvent, for instance: acetone, methylisobutyl ketone, toluene, xylene, and/or esters such as butyl acetate or ethyl glycol acetate, but the use of a solvent is not strictly necessary. Optionally, the reaction between the isocyanate groups and the hydroxy groups may be carried out in the presence of a catalyst. As examples of suitable catalysts may be mentioned organic tin salts or zinc salts such as dibutyl tin dilaurate, tin octoate and zinc octoate. Also mixtures of catalysts may be used.

According to the invention the coating composition may contain, in addition to the at least one acryloyl group and/or methacryloyl group-containing epoxy compound, a cross-linking agent for the epoxy groups. Representative cross-linking agents include amines, preferably polyfunctional amines, polyaminoamides, aldimines, ketimines and carboxylic acids which may be chlorinated, if desired. It is preferred that use should be made of cross-linking agent may generally be used in such an amount that per equivalent of epoxy compound 0,5 to 1,5, and preferably 0,9 to 1,1 equivalents of it are present in the composition.

Suitable polyfunctional amines include ethylene diamine, diethylene triamine, triethylene tetramine, isophoron diamine, xylene diamine. It is preferred that use should be made of adducts of mono- or polyfunctional amines, such as an adduct of the diglycidyl ether of Bisphenol A and an excess of ethylene diamine or diethylene tetramine. If it is desirable that the processing time of the mixture of the ethylenically unsaturated epoxy compound and the cross-linking agent be prolonged, then also a ketimine or aldimine may be employed, which gives reactive amine groups only upon hydrolysis by moisture from the ambient air. As non-modified aromatic amines may constitute a danger to health, it is preferred that aromatic amines be used in the form of an adduct.

The polyaminoamides to be used are generally reaction products of carboxylic acids, for instance fatty acids, and amines. Suitable organic acids and particularly chlorinated acids or acid adducts include those described in United States Patent Specification 3,218,274. The above envisaged cross-linking agents are generally known (see for instance Lee and Neville, Handbook of Epoxy Resins, Mc Graw Hill, New York) and need not be further described here. Besides or instead of the above-envisaged cross-linking agents there may, if desired, be used tertiary amines which initiate the cross-linking of the epoxy groups by the formation of ether bridges. Such amines are generally used in amounts of 0,1 to 10% by weight, based on the ethylenically unsaturated epoxy compound. Suitable tertiary amines include dimethylaminomethylphenol and 2,4,6-tris(dimethylaminomethylphenol). Generally, the cross-linking agent is mixed with the radiation curable epoxy compound shortly before processing.

The radiation curable composition further contains one or more photoinitiators in an amount of 0,1 to 10% by weight, based on the at least one acryloyl and/or methacryloyl group-containing epoxy compound. As examples of suitable initiators may be mentioned benzophenone, acetophenone, diethoxyacetophenone, chlorothioxanthone, benzoin and the ethers thereof, such as methyl ether, the ethyl ether, the (iso)propyl ether and the tert. butyl ether.

It is preferred that benzyldimethylketal should be used because it does not cause the composition to yellow or hardly. If desired, the composition may also contain photosensitizers.

The coating composition may, if desired, contain still other additives, for instance: pigment dispersing agents, levelling agents, fillers, pigments, colouring agents, polymerization inhibitors, solvents, catalysts for the reaction of the free epoxy groups with the cross-linking agent, such as benzyl alcohol, phenol or triphenyl phosphite. To obtain a special embodiment of the coating composition an emulsifier is added to the radiation curable free epoxy groups-containing binder, as a result of which the binder can be diluted with water when it is mixed with a suitable cross-linking agent such as a polyaminoamide (for instance the product that is marketed by Akzo Chemie under the trade name Casamid 360).

The coating composition may further contain monomers such as methyl methacrylate, ethyl methacrylate, butyl acrylate, 2-ethylhexyl acrylate, ethylene glycol diacrylate, neopentyl glycol diacrylate, glycerol triacrylate and trimethylol propane triacrylate. As reactive solvent also monofunctional epoxy compounds such as butylglycidyl ether or 2-ethyl-hexyl glycidyl ether may be used.

Application of the coating composition to a substrate may be carried out in any known manner for instance by roller coating, brushing, sprinkling, flow coating or dipping, and preferably by spraying. The coating composition may with advantage be applied to a substrate of a synthetic material such as polyurethane elastomers and to metal substrates, for instance as automobile paint or automobile repair paint, as coil coating or can coating and as shop primer to blasted steel. The composition may further be applied as furniture lacquer to, for instance, chip board, ply wood, board and veneered core board.

According to the invention hardening of the radiation curable coating composition is effected in 2 steps. In the first step the composition, after it has been applied to a particular substrate, is subjected to radiation having a wavelength range of 90 to 600 nm (UV-light and blue light). As radiation source there may serve, for instance, a high, medium or low pressure mercury or xenon lamp. The composition need be radiated only for a few seconds up to a few minutes in order to ensure such drying that the coating layer is tack-free and of such hardness that it can be handled.

In the second curing step the coating is given its final hardness as a result of the progressing reaction between the free epoxy groups and the cross-linking agent. The second curing step may take place at a temperature in the range, of, say, 0° to 160° C., over a period ranging from 5 minutes to a few days. It is preferred that this curing should take place over a period of several days at ambient temperature. It is found that after the coating has been cured for seven days at about 10° C., it has about the same hardness as after a curing treatment of 10 minutes at 120° C. Carrying out the second curing step at ambient temperature offers the considerable advantage that it does not require any energy of capital expenditure.

The invention will be further illustrated in the following examples which are not to be considered to limit the scope of the present invention.

In these examples use is made of the radiation curable and at least one acryloyl group or methacryloyl group-containing epoxy compounds A-M, the preparation of which is given below.

A. A mixture of 380 g of diglycidyl ether of Bisphenol A (marketed by Shell under the trade name Epikote 828) and 72 g of acrylic acid was dissolved in 150 g of toluene. To the resulting solution were added 1,8 g of benzyltrimethyl ammonium methoxide as catalyst and 0,44 g of tert. butyl hydroquinone as inhibitor. The mixture was heated to 80° C. with stirring and passing through a stream of nitrogen. After 5 hours a product was obtained whose acid number had decreased to 5,4.

B. A mixture of 154 g of hexahydrophthalic anhydride, 130 g of hydroxypropyl acrylate and 0,3 g of hydroquinone was heated to 100° C. with stirring and passing through a stream of nitrogen. After 3 hours a product having an acid number of 210 was obtained. Subsequently, the mixture was cooled to 80° C. and 380 g of diglycidyl ether of Bisphenol A (marketed by Shell under the trade name Epikote 828), 118 g of toluene and 2,4 g of benzyl trimethyl ammonium methoxide were added. Heating was continued for two hours, with stirring and under an atmosphere of nitrogen, as a result of which a product having an acid number of 40 and a viscosity of 15 P at 25° C. was obtained.

C. A mixture of 154 g of hexahydrophthalic anhydride, 492 g of pentaerythritol triacrylate and 2,4 g of hydroquinone was heated for 7 hours at 100° C., with stirring and under an atmosphere of nitrogen. After 7 hours a product having an acid number of 110 was obtained. Subsequently, the sample was cooled to 90° C. and 390 g of glycidyl ether of Bisphenol A (marketed by Shell under the trade name Epikote 828) 2,4 g of N,N-dimethylbenzylamine and 243 g of toluene were added. Stirring was continued for 8 hours under an atmosphere of nitrogen, after which a product having an acid number of 4, a viscosity of 6 P at 25° C. and an epoxy oxygen content of 1,3% was obtained.

D. A mixture of 154 g of hexahydrophthalic anhydride, 492 g of pentaerythritol triacrylate and 2,4 g of hydroquinone was heated for 6 hours at 100° C., with stirring and under an atmosphere of nitrogen, as a result of which a product having an acid number of 113 was obtained. Subsequently, the mixture was cooled to 80° C., after which 286 g of epoxynovolac resin (marketed by Dow Chemical under the trade name DEN 438), 203 g of toluene and 1,2 g of N,N-dimethylbenzylamine were added. After continued heating for 6 hours, with stirring and under an atmosphere of nitrogen at 80° C. a product having an acid number of 12, a viscosity of 20 P at 25° C. and an epoxy oxygen content of 2,4 was obtained.

E. A mixture of 276 g of an aliphatic epoxy resin having an epoxy equivalent weight of 138 (marketed by Dow under the trade name DER XD 7114), 118 g of toluene, 72 g of acrylic acid, 1,8 g of benzyltrimethyl ammonium methoxide and 0,44 g of p-tert.butylhydroquinone was heated for 11 hours at 80° C., with stirring and under an atmosphere of nitrogen. The product obtained had an acid number of 4,2, a viscosity of 0,5 P at 25° C. and an epoxy oxygen content of 2,95%.

F. A mixture of 308 g of a hydantoin epoxy resin having an epoxy equivalent weight of 154 (marketed by Ciba Geigy under the trade name XB 2793), 72 g of acrylic acid, 128 g of toluene, 0,38 g of tert.butyl hydroquinone and 2,76 g of benzyltrimethyl ammonium methoxide was heated for 6 hours at 80° C., with stirring and passing through a stream of nitrogen. The product obtained had an acid number of 7,5, a viscosity of 1 P at 25° C. and an epoxy oxygen content of 4,3%.

G. A mixture of 360 g of a hydantoin epoxy resin having an epoxy equivalent of 120 (marketed by Ciba Geigy under the trade name XB 2818), 72 g of acrylic acid, 146 g of toluene, 1,72 g of trimethyl ammonium methoxide and 0,43 g of tert.butyl hydroquinone was heated for 6 hours at 80° C., with stirring and passing through a stream of nitrogen. The product obtained had an acid number of 7,9, a viscosity of 10 P at 25° C. and an epoxy oxygen content of 3,8%.

H. A mixture of 134 g of trimethylol propane, 154 g of hexahydrophthalic anhydride and 86 g of toluene was heated for 2 hours at 120° C., with stirring and under an atmosphere of nitrogen, resulting in a product having an acid number of 146. Subsequently, 66 g of hexane, 144 g of acrylic acid, 1,4 g of methoxyphenol, 2,9 g of para-toluene sulphonic acid and 230 g of toluene were added. This mixture was heated under reflux for 18 hours at 90° C., 32 ml of water being drained off. After the hexane had been distilled off, the mixture was heated to 100° C., followed by adding 428 g of the trifunctional hydantoin epoxy resin (marketed by Ciba under the trade name XB 2818) and 1,24 g of benzyltrimethyl ammonium methoxide. After heating for 3 more hours at 100° C. a product having an acid number of 1 and a viscosity of 260 P at 20° C. was obtained.

I. The procedure of preparing binder H was repeated, with the exception that use was made of 292 g of the hydantoin epoxy resin (marketed by CIBA under the trade name XB 2793) instead of the 428 g of hydantoin epoxy resin (marketed by CIBA under the trade name XB 2818). The product obtained had an acid number of 5,4 and a viscosity of 200 P at 20° C.

K. A mixture of 765 g of the adduct of 3 molecules of hexamethylene diisocyanate and 1 water molecule (as 75% by weight solution in ethylglycol acetate (marketed by Bayer under the trade name Desmodur N 75) and 0,21 g of dibutyl tin dilaurate was heated to 40° C. Subsequently, over a period of 1 hour 261 g of hydroxypropyl acrylate were added, with stirring and under an atmosphere of nitrogen. After continued heating for 2 hours at 40° C. 525 g of a difunctional diglycidyl ether of Bisphenol A having a molecular weight of about 950 (marketed by Shell Chemical under the trade name Epikote 1001) as 75% by weight solution in xylene and 209 g of methylethyl ketone were added. Over a period of 4 hours the temperature was increased to 60° C., with stirring and under an atmosphere of nitrogen. The product obtained had a free isocyanate content of 0,28% by weight. The viscosity of the final product was 6 P at 25° C.

L. A mixture of 113,6 g of diphenylmethane diisocyanate, 200 g of pentaerythritol triacrylate, 55 g of butyl acetate, 0,05 g of dibutyltindilaurate and 0,02 g of p.tert.butyl catechol was heated for 3 hours at 50° C., with stirring and under an atmosphere of nitrogen. Subsequently, 192 g of butyl acetate, 465 g of a 75% solution in xylene of a difunctional diglycidyl ether of Bisphenol A having a molecular weight of about 950 and again 0,05 g of dibutyltindilaurate were added. After another 3 hours' stirring under an atmosphere of nitrogen at 50° C. the reaction was terminated and the product obtained had an efflux viscosity of 90 seconds DIN cup 7 mm at 20° C.

M. A mixture of 38 g of cyclohexyl diisocyanate, 100 g of pentaerythritol triacrylate, 80 g of butyl acetate, 0,125 g of dibutyltindilaurate and 0,25 g of p.tert.butyl catechol was heated for 3 hours at 70° C., with stirring and under an atmosphere of nitrogen. Subsequently, 186 g of a difunctional diglycidyl ether of Bisphenol A having a molecular weight of about 470 (marketed by Shell under the trade name Epikote 834), 32,6 g of butyl acetate and again 0,125 g of dibutyltindilaurate were added. After another 3 hours' stirring under nitrogen ate 70° C. the reaction was terminated. The product obtained had a free isocyanate content of 3,9% by weight and a viscosity of 8 P at 25° C.

EXAMPLES I-IV

In each of these examples 100 parts by weight of the epoxy compound given in Table 1 were mixed with 2 parts by weight of chlorothioxanthone as accelerator and with the amount of triethylene tetramine (TETA) given in Table 1 as cross-linking agent. The resulting compositions were applied to steel in a layer thickness of 35 μm (in the cured state) and subsequently fed past a UV-lamp, type HOK 5 (made by Philips) at a distance therefrom of 40 cm and at a rate of 3,5 m/min.

Immediately after radiation the tackiness of the samples was determined. The panels were kept at a temperature of 20° C. and the Persoz hardness was measured after 30 minutes, 1 day, 2 days, 4 days and 7 days, respectively, the values obtained being expressed in seconds. Finally, in each experiment the adhesion was determined after 7 days by means of the cross-hatch test in accordance with DIN 53151 and expressed in mm. The results obtained are listed in Table 1.

TABLE 1

| Example | Epoxy compound | Parts by weight TETA | Tackiness | Persoz hardness after | | | | | adhesion |
| | | | | 30 min. | 1 day | 2 days | 4 days | 7 days | |
|---|---|---|---|---|---|---|---|---|---|
| I | A | 1,55 | slightly tacky | 29 | 35 | 60 | 90 | 114 | 0,4 |
| II | B | 1,77 | slightly tacky | 25 | 30 | 50 | 75 | 92 | 0,4 |
| III | C | 0,74 | tack free | 52 | 65 | 85 | 115 | 134 | 0,9 |
| IV | D | 1,33 | tack free | 46 | 60 | 92 | 144 | 170 | 0,6 |

EXAMPLES V-IX

The procedure of Example IV was repeated, but in such a way that use was made of 6 parts by weight of an acrylate oxazolidine resin (marketed by Rohm & Haas under the trade name QR 568) as accelerator and the cross-linking agents given in Table 2 in the amounts by weight mentioned therein. The cross-linking agent A is an adduct of a diglycidyl ether of Bisphenol A and a polyamino amide, having an amine number of 210-260 (available under the trade name Versadukt 460 of Schering). The cross-linking agent B is an adduct of a diglycidyl ether of Bisphenol A and xylene diamine, having an amine number of 280-320 (marketed by Akzo Chemie under the trade name Casamid 420).

The cross-linking agent C is a polyether polyamine having an amine number of 499 (marketed by Veba Chemie under the trade name Veba 214). The cross-linking agent D is 2,4,6-tris(dimethylaminomethyl)-phenol. The cross-linking agent E is a ketimine from 1 mole of ethylene diamine and 2 moles of methylethyl ketone. The results obtained are mentioned in Table 2.

TABLE 2

| Example | Cross-linking agent Type | Parts by weight | Tackiness | Persoz hardness after 30 min | 1 day | 2 days | 7 days | Adhesion |
|---|---|---|---|---|---|---|---|---|
| V | A | 13,3 | tack free | 44 | 82 | 133 | 199 | 0,3 |
| VI | B | 10,4 | tack free | 46 | 80 | 138 | 228 | 0,2 |
| VII | C | 6,2 | tack free | 57 | 124 | 174 | 248 | 0,2 |
| VIII | D | 3,0 | tack free | 43 | 85 | 146 | 173 | 0,2 |
| IX | E | 1,4 | tack free | 30 | 60 | 92 | 170 | 0,8 |

EXAMPLES X-XI

The procedure of Example VI was repeated, except that use was made of the epoxy compounds L and M as binders instead of the epoxy compound D. The results obtained are given in Table 3.

TABLE 3

| Example | Epoxy compound Type | Parts by weight | Tackiness | Persoz hardn. after 30 min | 1 day | 4 days | 7 days | Adhesion |
|---|---|---|---|---|---|---|---|---|
| X | L | 16 | tack free | 36 | 167 | 288 | 316 | 0,2 |
| XI | M | 3,2 | tack free | 40 | 149 | 269 | 323 | 0,9 |

EXAMPLES XII-XVI

In each of these examples 100 parts by weight of the epoxy compounds given in Table 4 were mixed with 3 parts by weight of benzoin propyl ether as initiator and with chlorine-containing carboxylic acid as cross-linking agent in the amount (parts by weight) given in Table 4. The cross-linking agent employed was an 83,5% by weight solution of the esterification product of 1 mole of pentaerythritol and 4 moles of hexachloroendomethylene tetrahydrophthalic acid having an acid number of 108 in a mixture of equal parts by weight of xylene and butanol. The resulting compositions were applied to steel in a layer thickness of 25 μm (in the cured state) and subsequently fed past a UV-lamp, type HOK (made by Philips) at a distance therefrom of 40 cm and at a rate of 3,5 m/min. The results obtained are given in Table 4. The values measured are expressed in the same dimensions as in the preceding examples.

TABLE 4

| Example | Epoxy compound | Amount of cross-linking agent | Tackiness | Persoz hardness after 30 min. | 1 day | 2 days | 5 days | 7 days | Adhesion |
|---|---|---|---|---|---|---|---|---|---|
| XII | E | 36 | slightly tacky | 40 | 89 | 131 | 176 | 221 | 0,2 |
| XIII | F | 50 | tack free | 43 | 101 | 190 | 209 | 227 | 0,4 |
| XIV | G | 47 | tack free | 67 | 192 | 231 | 289 | 317 | 0,9 |
| XV | H | 91 | tack free | 43 | 170 | 221 | 277 | 296 | 0,9 |
| XVI | I | 114 | tack free | 55 | 174 | 211 | 276 | 288 | 0,9 |

EXAMPLES XVII-XIX

In each example 100 parts by weight of the epoxy compounds given in Table 5 were mixed with 2,5 parts by weight of chlorothioxanthone as initiator, 7,5 parts by weight of an acrylate oxazolidine resin (marketed by Rohm & Haas under the trade name QR 568) as accelerator and an adduct in the amount by weight given in Table 5 of a diglycidyl ether of Bisphenol A and xylene diamine, having an amine number of 280-320 (marketed by Akzo Chemie under the trade name Casamid 420) as cross-linking agent. The compositions obtained were applied to steel in a layer thickness of 30 μm (in the cured state) and subsequently the panels were fed past a UV-lamp, type HOK 5 (made by Philips) at a distance therefrom of 40 cm and at a rate of 6 m/min. The number of times the panels had to be fed past the UV-lamp to obtain a tack free surface was determined. Moreover, the curing of the composition was evaluated after the panels had been kept at 20° C. for 18 hours. It was found to be reasonably good then. After 2 days the curing was found to range from good to excellent.

TABLE 5

| Example | Epoxy compound | Cross-linking agent (parts by weight) | Rate of passage until tack free |
|---|---|---|---|
| XVII | H | 32,3 | 1x |
| XVIII | I | 40,1 | 2x |
| XIX | K | 8,7 | 1x |

What is claimed is:

1. A process for coating a substrate which comprises applying to the substrate a radiation curable composition comprising
   (1) an epoxy compound which consists essentially of an epoxy compound which contains at least one acryloyl or methacryloyl group,
   (2) a photoinitiator, and
   (3) a cross-linking agent which reacts at ambient temperature with the epoxy groups of (1) and is a member selected from the group consisting of amines, polyaminoamides, aldimines, ketimines, and carboxylic acids physically blended together, exposing the resulting coating to U.V. radiation at an ambient temperature to polymerize the epoxy compound and chemically reacting the epoxy groups with the cross-linking agent.

2. The process of claim 1 wherein the composition contains 0.1 to 10% by weight of the photoinitiator, based on the weight of the epoxy compound.

3. The process of claim 1 or 2 wherein the composition is exposed to radiation having a wave length of 90 to 600 nm.

4. The process of claim 1 wherein the acryloyl or methacryloyl groups are cured in a first step with ultra violet light and the epoxy groups are cured with the cross-linking agent in a second step.

5. The process of claim 1, characterized in that the cross-linking agent is used in an amount of 0.5 to 1.5 equivalents per equivalent of the epoxy compound.

6. The process of claim 1, characterized in that the cross-linking agent is used in an amount of 0.9 to 1.1 equivalents per equivalent of the epoxy compound.

7. A substrate provided with a cured coating composition obtained by the process according to claims 5, 6, 1 or 2.

* * * * *